(12) United States Patent
Mikawa et al.

(10) Patent No.: US 10,584,648 B2
(45) Date of Patent: Mar. 10, 2020

(54) CONTROL DEVICE AND CONTROL METHOD FOR VARIABLE VALVE TIMING MECHANISM

(71) Applicant: Hitachi Automotive Systems, Ltd., Hitachinaka-shi, Ibaraki (JP)

(72) Inventors: Kentaro Mikawa, Isesaki (JP); Nobuhiko Matsuo, Isesaki (JP); Naoki Okamoto, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 16/332,414

(22) PCT Filed: Jan. 19, 2018

(86) PCT No.: PCT/JP2018/001577
§ 371 (c)(1),
(2) Date: Mar. 12, 2019

(87) PCT Pub. No.: WO2018/150810
PCT Pub. Date: Aug. 23, 2018

(65) Prior Publication Data
US 2019/0360407 A1 Nov. 28, 2019

(30) Foreign Application Priority Data

Feb. 16, 2017 (JP) .................................. 2017-026667

(51) Int. Cl.
*F02D 13/02* (2006.01)
*F01L 1/352* (2006.01)
(Continued)

(52) U.S. Cl.
CPC .......... *F02D 13/0215* (2013.01); *F01L 1/352* (2013.01); *F01L 1/356* (2013.01);
(Continued)

(58) Field of Classification Search
CPC ... F01L 1/053; F01L 1/344; F01L 1/46; F01L 2013/103; F01L 2013/111;
(Continued)

(56) References Cited

U.S. PATENT DOCUMENTS

2005/0211207 A1  9/2005  Urushihata et al.
2006/0042579 A1  3/2006  Izumi et al.
(Continued)

FOREIGN PATENT DOCUMENTS

JP  2006-70754 A  3/2006
JP  2008-69719 A  3/2008
(Continued)

OTHER PUBLICATIONS

International Search Report (PCT/ISA/210) issued in PCT Application No. PCT/JP2018/001577 dated Apr. 3, 2018 with English translation (five (5) pages).

(Continued)

*Primary Examiner* — Jorge L Leon, Jr.
(74) *Attorney, Agent, or Firm* — Crowell & Moring LLP

(57) ABSTRACT

In a control device and a control method for a variable valve timing mechanism according to the present invention, the rotational phase of a camshaft is measured based on the cam angle signal and crank angle signal upon receiving each pulse of the cam angle signal, and the rotational phase change over time within a period of the cam angle signal is measured based on the motor angle signal. It is decided whether the cam angle signal and/or crank angle signal has a prescribed pulse pattern at a diagnostic timing that comes after the last pulse of the cam angle signal. When this decision result is positive, it is then decided whether the motor angle sensor operates normally or abnormally based on the rotational phase and the amount of rotational phase (Continued)

change that are measured when the last pulse of the cam angle signal is received before the diagnostic timing.

5 Claims, 9 Drawing Sheets

(51) Int. Cl.
*F01L 1/356* (2006.01)
*F01L 1/344* (2006.01)
(52) U.S. Cl.
CPC .. *F01L 2001/34426* (2013.01); *F01L 2800/11* (2013.01); *F01L 2820/041* (2013.01)
(58) Field of Classification Search
CPC ............. F01L 2013/113; F01L 2800/11; F01L 2800/14; F01L 2820/032; F01L 2820/041; F01L 2820/042; F02D 13/0215; F02D 13/0219
USPC ............................................ 123/90.15, 90.17
See application file for complete search history.

(56) References Cited

U.S. PATENT DOCUMENTS

| 2006/0260573 | A1 | 11/2006 | Urushihata et al. | |
|---|---|---|---|---|
| 2008/0066700 | A1 | 3/2008 | Mashiki et al. | |
| 2009/0255510 | A1* | 10/2009 | Mashiki | F01L 1/352 123/347 |
| 2010/0235067 | A1* | 9/2010 | Nomura | F01L 1/344 701/103 |
| 2013/0080027 | A1* | 3/2013 | Mikawa | F02D 13/0238 701/102 |
| 2016/0215662 | A1* | 7/2016 | Sato | F01L 1/352 |
| 2016/0348603 | A1 | 12/2016 | Mikawa et al. | |

FOREIGN PATENT DOCUMENTS

| JP | 4123127 B2 | 7/2008 |
|---|---|---|
| JP | 2015-140765 A | 8/2015 |
| JP | 2016-215933 A | 12/2016 |

OTHER PUBLICATIONS

Japanese-language Written Opinion (PCT/ISA/237) issued in PCT Application No. PCT/JP2018/001577 dated Apr. 3, 2018 with English translation (six (6) pages).
International Preliminary Report on Patentability (PCT/IB/338 & PCT/IB/373) issued in PCT Application No. PCT/JP2018/001577 dated Aug. 29, 2019, including English translation (Japanese-language Written Opinion (PCT/ISA/237) previously filed on Mar. 12, 2019) (seven (7) pages).

* cited by examiner

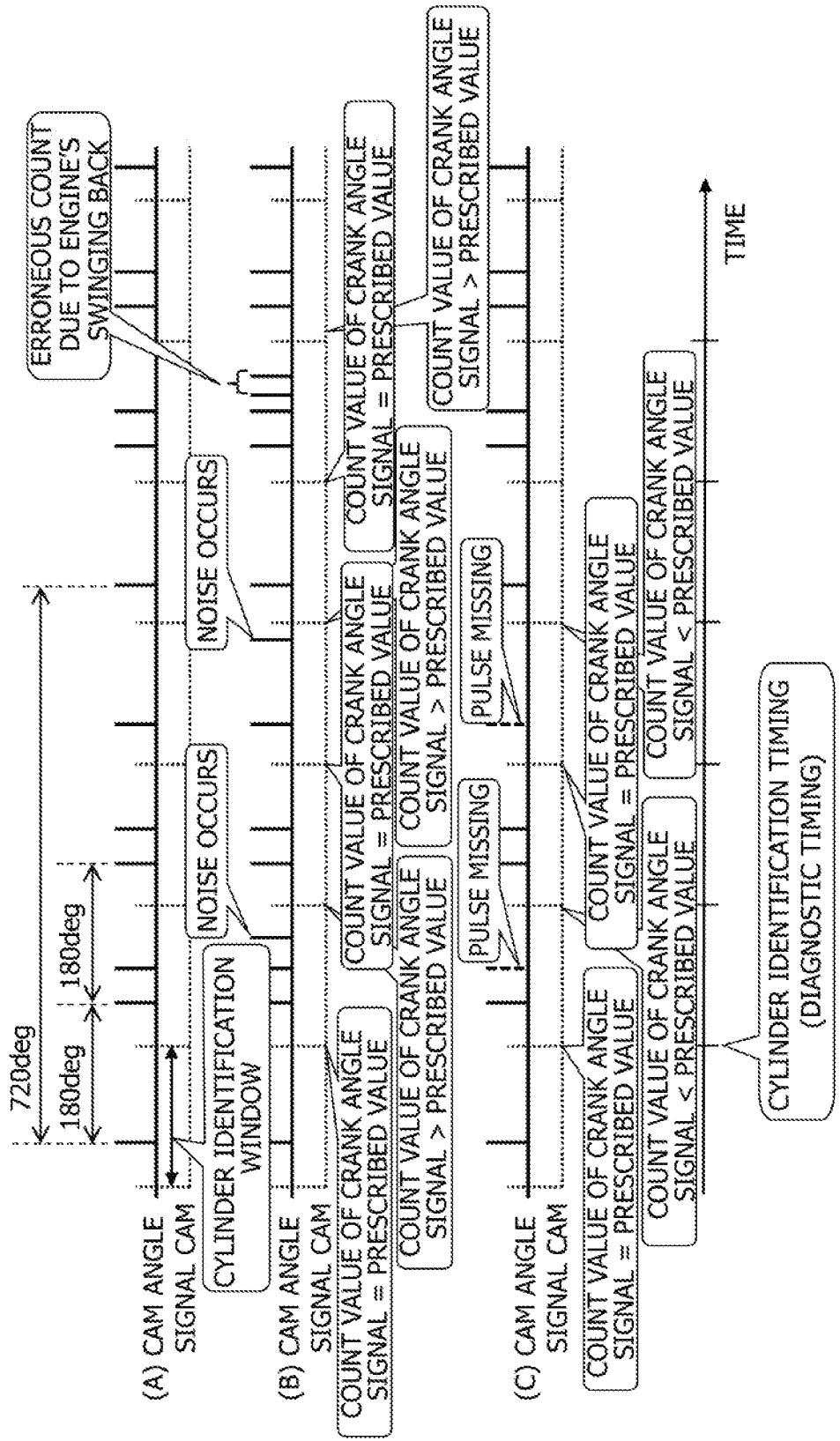

CONTROL DEVICE AND CONTROL METHOD FOR VARIABLE VALVE TIMING MECHANISM

TECHNICAL FIELD

The present invention relates to a control device and to a control method for a variable valve timing mechanism configured to change a rotational phase of a camshaft relative to a crankshaft in an internal combustion engine by adjusting a rotation speed of a motor.

BACKGROUND ART

Patent Document 1 discloses a control device for a variable valve timing mechanism configured to change the camshaft phase by adjusting the rotation speed of a motor relative to half the rotation speed of the crankshaft. The control device includes: a means for calculating an actual valve timing based on the cam angle signal and crank angle signal upon each output of the cam angle signal; a means for calculating an amount of valve timing change at a predetermined calculation frequency based on a difference between the rotation speed of the motor and half the rotation speed of the crankshaft; and a means for calculating a final actual valve timing based on the calculated actual valve timing at the output of the cam angle signal and the calculated amount of valve timing change.

REFERENCE DOCUMENT LIST

Patent Document

Patent Document 1: JP 4123127 B

SUMMARY OF THE INVENTION

Problem to be Solved by the Invention

In such a variable valve timing mechanism configured to change the rotational phase of the camshaft by adjusting the rotation speed of a motor relative to the crankshaft, it can be diagnosed whether the motor angle sensor operates normally or abnormally based on comparison of the actual valve timing calculated based on the cam angle signal and crank angle signal upon each output of the cam angle signal with the amount of valve timing change calculated based on the rotation speed of the motor.

However, while, for example, the engine is in a low rotation speed range such as during the engine start-up, the actual valve timing value calculated based on the cam angle signal and crank angle signal tends to contain an error. This results in a risk of erroneously diagnosing that the motor angle sensor operates abnormally. A conceivable solution to this may be setting a threshold used in abnormality diagnosis of the motor angle sensor to a value that ensures that an error in the calculated actual valve timing value would not cause erroneous abnormality diagnosis of the motor angle sensor. However, in turn, this may cause a problematic detection failure of an abnormality that does actually occur in the motor angle sensor.

The present invention has been made in view of the above problem, and an object of the present invention is to provide a control device and a control method for a variable valve timing mechanism that are capable of accurately diagnosing a fault of a motor angle sensor while preventing or reducing the risk of erroneously diagnosing that the motor angle sensor operates abnormally even when the actual valve timing value calculated based on the cam angle signal and crank angle signal contains an error.

Means for Solving the Problem

To this end, an aspect of the present invention provides a control device for a variable valve timing mechanism of an internal combustion engine that includes: the variable valve timing mechanism configured to change a rotational phase of a camshaft relative to a crankshaft in the internal combustion engine by adjusting a rotation speed of a motor; a crank angle sensor configured to output a crank angle signal having pulses each generated for a predetermined crank angle degree; a cam angle sensor configured to output a cam angle signal having pulses each generated for a predetermined cam angle degree; and a motor angle sensor configured to output a motor angle signal in accordance with a rotation angle of the motor. The control device comprises: a first measuring unit configured to measure the rotational phase based on the cam angle signal and the crank angle signal upon each pulse of the cam angle signal; a second measuring unit configured to measure an amount of change of the rotational phase over time within a period of the cam angle signal, based on the motor angle signal; a control unit configured to adjust the rotation speed of the motor based on the measurements obtained by the first and second measuring units; and a diagnosing unit configured to: decide whether or not at least one of the cam angle signal and the crank angle signal has a prescribed pulse pattern at a diagnostic timing that comes after a last pulse of the cam angle signal; and, when at least one of the cam angle signal and the crank angle signal has the prescribed pulse pattern, decide whether the motor angle sensor operates normally or abnormally based on the measurements that the first and second measuring units obtain when the last pulse of the cam angle signal is received before the diagnostic timing.

Furthermore, an aspect of the present invention provides a control method for a variable valve timing mechanism of an internal combustion engine that includes: the variable valve timing mechanism configured to change a rotational phase of a camshaft relative to a crankshaft in the internal combustion engine by adjusting a rotation speed of a motor; a crank angle sensor configured to output a crank angle signal having pulses each generated for a predetermined crank angle degree; a cam angle sensor configured to output a cam angle signal having pulses each generated for a predetermined cam angle degree; and a motor angle sensor configured to output a motor angle signal in accordance with a rotation angle of the motor. The control method comprises: measuring the rotational phase based on the cam angle signal and the crank angle signal upon receiving each pulse of the cam angle signal; measuring an amount of change of the rotational phase over time within a period of the cam angle signal, based on the motor angle signal; adjusting the rotation speed of the motor based on the measured rotational phase and the measured amount of change of the rotational phase; and deciding whether or not at least one of the cam angle signal and the crank angle signal has a prescribed pulse pattern at a diagnostic timing that comes after a last pulse of the cam angle signal, and, when at least one of the cam angle signal and the crank angle signal has the prescribed pulse pattern, deciding whether the motor angle sensor operates normally or abnormally based on the rotational phase and the amount of change of the rotational phase that are measured when the last pulse of the cam angle signal is received before the diagnostic timing.

Effects of the Invention

The invention as described above allows accurately diagnosing whether the motor angle sensor operates normally or abnormally while preventing or reducing the risk of erroneously diagnosing that the motor angle sensor operates abnormally, when the rotational phase measured based on the cam angle signal and crank angle signal contains an error.

BRIEF DESCRIPTION OF THE DRAWINGS

FIG. 9 is a time chart illustrating example pulse count values of the cam angle signal CAM that obtained when noise is superimposed on the crank angle signal POS, when pulse missing occurs in the cam angle signal CAM, and when an engine rotates in the reverse direction, according to an embodiment of the present invention.

MODE FOR CARRYING OUT THE INVENTION

Figure 1:
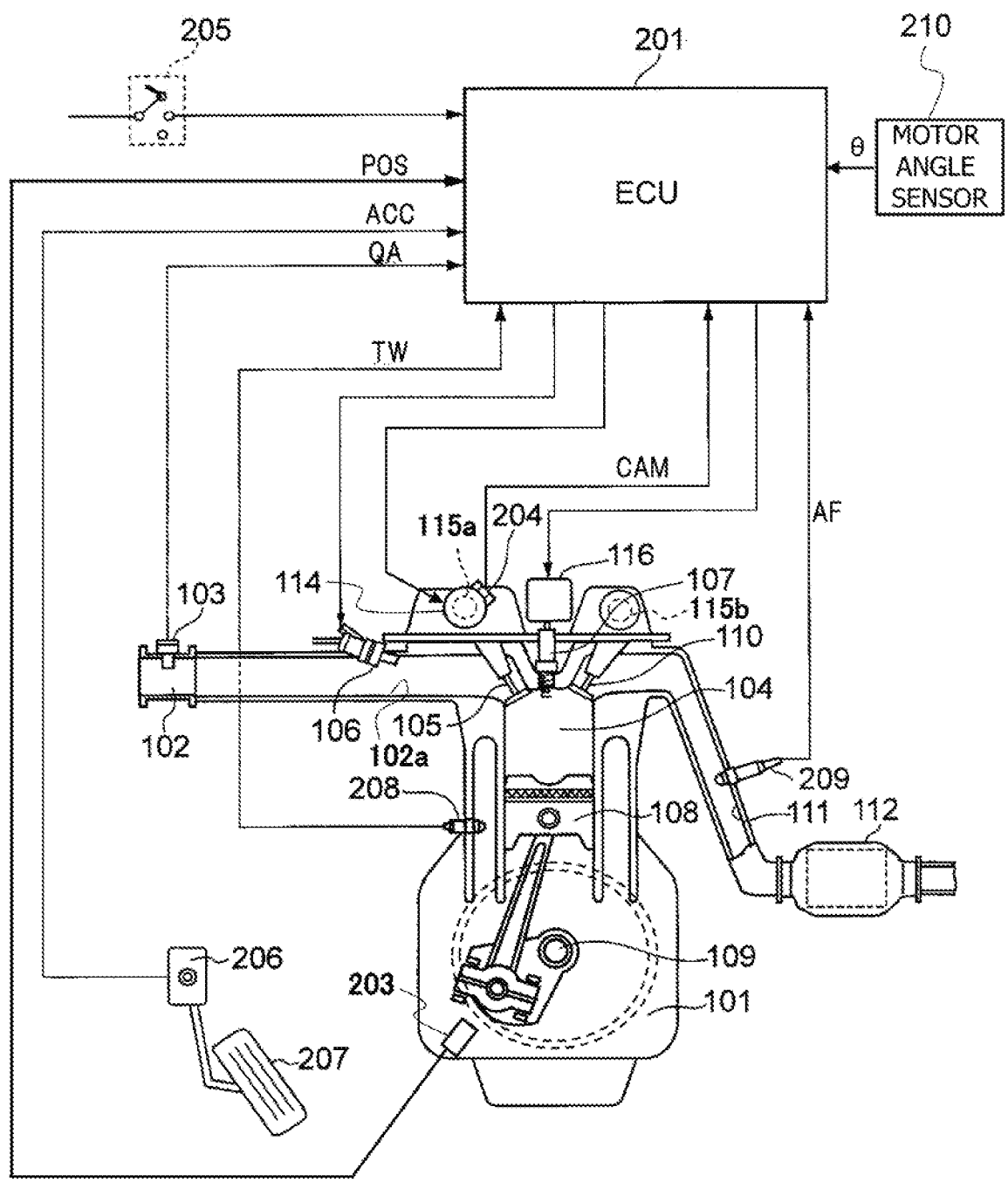
FIG. 1 illustrates a system configuration of an internal combustion engine according to an embodiment of the present invention.

An embodiment of the present invention will be described below. FIG. 1 illustrates an embodiment of an internal combustion engine provided with a variable valve timing mechanism to which a control device and a control method according to the present invention are applied. An internal combustion engine 101 in FIG. 1 is mounted on a vehicle (not illustrated in the drawings) and configured to power the vehicle.

An intake air amount sensor 103 disposed in an intake duct 102 of internal combustion engine 101 senses an intake air flow rate QA of internal combustion engine 101. Intake valves 105 open and close the air inlet of a combustion chamber 104 of each cylinder. A fuel injection valve 106 is disposed at an intake port 102a of each cylinder. Alternatively, fuel injection valve 106 may be disposed so as to inject fuel directly into each combustion chamber 104.

The fuel injected from fuel injection valve 106 is taken with air into combustion chamber 104 through intake valves 105, and spark-ignited by a spark plug 107 and burned in combustion chamber 104. The resultant combustion pressure presses down a piston 108 toward a crankshaft 109, and thereby rotates crankshaft 109. In addition, exhaust valves 110, which are configured to open and close the air outlet of combustion chamber 104, open and discharge exhaust from combustion chamber 104 to an exhaust pipe 111.

A catalytic converter 112 using a catalyst such as a three-way catalyst is disposed in exhaust pipe 111. Intake valves 105 open in accordance with the rotation of an intake camshaft 115a rotationally driven by crankshaft 109. Exhaust valves 110 open in accordance with the rotation of an exhaust camshaft 115b rotationally driven by crankshaft 109.

A variable valve timing mechanism 114 is configured to continuously change valve timing (opening/closing timing) of intake valves 105. Variable valve timing mechanism 114 is an electric variable valve timing mechanism actuated by a motor to change the rotational phase of intake camshaft 115a with respect to crankshaft 109.

An ignition module 116 for supplying ignition energy to spark plug 107 that is provided to each cylinder is directly attached to spark plug 107. Ignition module 116 includes an ignition coil and a power transistor configured to control power supply to the ignition coil. A control device (ECU) 201 including a microcomputer (processor) receives signals output from various sensors and switches. Control device 201 performs arithmetic processing on these signals in accordance with a program pre-stored in a memory, and calculates and outputs operation variables for various devices such as fuel injection valve 106, variable valve timing mechanism 114, ignition module 116, and the like.

Also, control device 201 receives a signal output from intake air amount sensor 103. In addition, control device 201 receives signals output from a crank angle sensor 203, an accelerator position sensor 206, a cam angle sensor 204, a water temperature sensor 208, an air-fuel ratio sensor 209, a motor angle sensor 210, and the like. Crank angle sensor 203 outputs a crank angle signal POS having pulses each generated for a predetermined crank angle degree of crankshaft 109. Accelerator position sensor 206 senses how far an accelerator pedal 207 is pressed (i.e., senses the accelerator position ACC). Cam angle sensor 204 outputs a cam angle signal CAM having pulses each generated for a predetermined cam angle degree of intake camshaft 115a. Water temperature sensor 208 senses a cooling water temperature TW in internal combustion engine 101. Air-fuel ratio sensor 209, which is disposed in exhaust pipe 111 at a position upstream of catalytic converter 112, senses the air-fuel ratio AF based on the oxygen concentration of the exhaust. Motor angle sensor 210 outputs a motor angle signal MAS in accordance with the rotation angle of the actuator motor for variable valve timing mechanism 114. Furthermore, control device 201 receives other signals such as a signal output from an ignition switch (engine switch) 205, which is a main switch for enabling or disabling the operation of internal combustion engine 101.

The crank angle signal POS output from crank angle sensor 203 is a pulse signal having an output pattern set so as to generate a pulse generally for each unit crank angle degree while skipping one or more consecutive pulses for each crank angle degree that corresponds to the stroke phase difference between cylinders. For example, the unit crank angle may be 10 degrees, and the stroke phase difference between cylinders, which corresponds to the ignition interval, may be 180 degrees of crank angle for a four-cylinder internal combustion engine.

Alternatively, crank angle sensor 203 may be configured to output a crank angle signal POS having pulses each generated regularly for a unit crank angle degree, and to output a separate reference crank angle signal having pulses each generated for a crank angle degree that corresponds to the stroke phase difference between cylinders. Either the pulse skip position of the crank angle signal POS where one or more pulses each of which is generally generated for the unit crank angle degree are skipped or the position corresponding to the reference crank angle signal indicates that any of the pistons of the cylinders reaches the reference piston position.

Cam angle sensor 204 outputs the cam angle signal CAM having pulses each generated for a crank angle degree that corresponds to the stroke phase difference between cylinders. Intake camshaft 115a rotates at half the rotation speed of crankshaft 109. Thus, when internal combustion engine 101 is a four-cylinder engine and the crank angle corresponding to the stroke phase difference between cylinders is 180 degrees, 180 degrees of crank angle corresponds to 90 degrees of rotation angle of intake camshaft 115a. That is, cam angle sensor 204 outputs the cam angle signal CAM upon each 90-degree rotation of intake camshaft 115a.

The cam angle signal CAM output from cam angle sensor 204 is a signal used for identification of the cylinder located at the reference piston position (for cylinder identification processing). For example, the cam angle signal CAM having pulses with characteristics representing identification numbers of the cylinders may be output upon each rotation of crank angle that corresponds to the stroke phase difference between cylinders (every 180 degrees of crank angle for a four-cylinder engine). When internal combustion engine 101 is a four-cylinder engine, cam angle sensor 204 outputs the cam angle signal CAM every 180 degrees of crank angle (each 90-degree rotation of intake camshaft 115a) such that a sequence of "a single pulse, a double pulse (two pulses generated in rapid succession), a double pulse, a single pulse" is repeated, for example.

Control device 201 also performs the cylinder identification processing. Specifically, control device 201 counts the number of pulses of the cam angle signal CAM that are output every 180 degrees of crank angle, and thereby identifies which of the four cylinders reaches the reference piston position. Note that the numerical arrangement in the pulse pattern of the cam angle signal CAM for the cylinder identification processing is not limited to the above. Alternatively, the output characteristics (signal output pattern) of cam angle sensor 204 may be set such that the cylinders may be identified based on the pulse width or amplitude instead of the number of pulses of the cam angle signal CAM.

Figure 2:
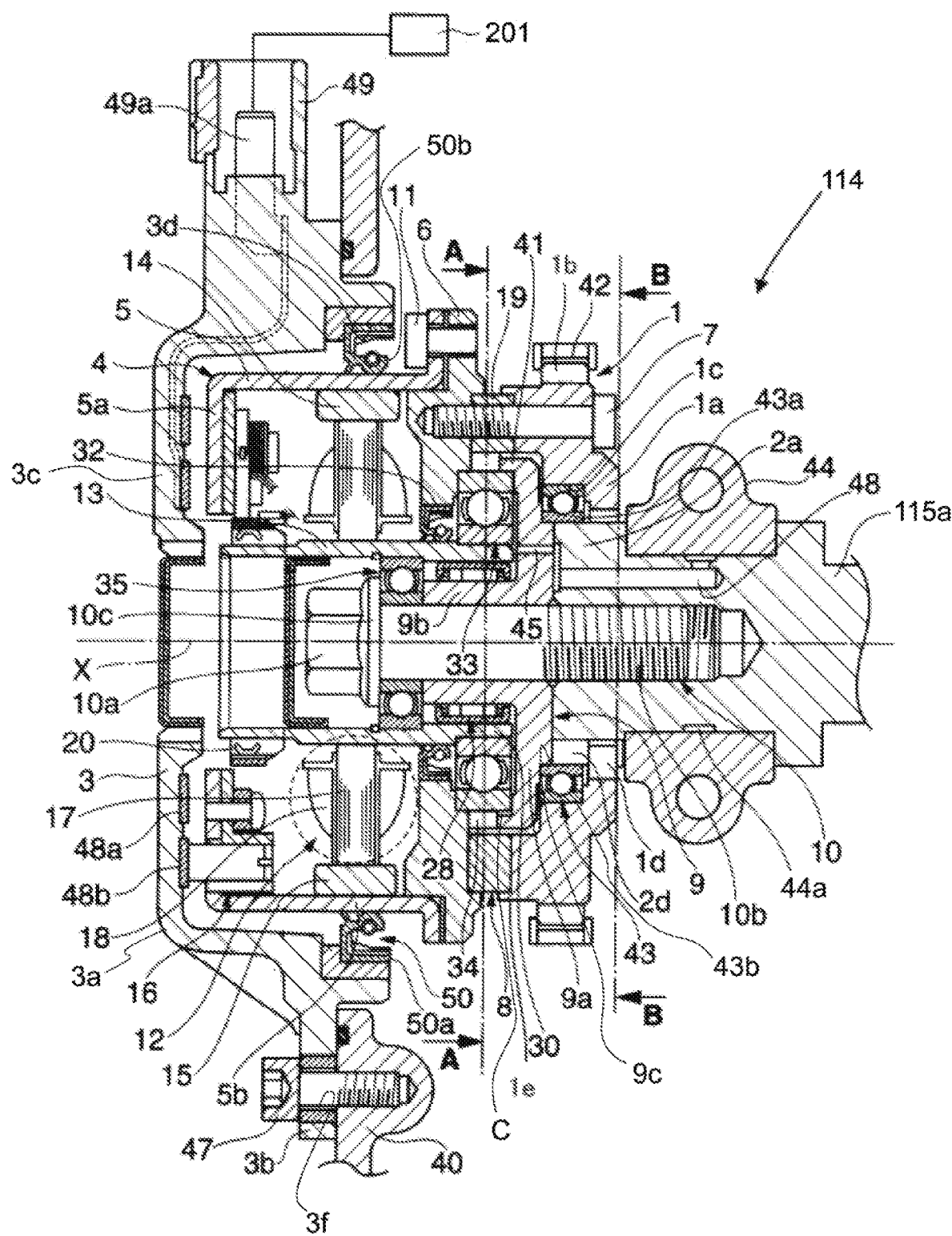
FIG. 2 is a cross-sectional view of a variable valve timing mechanism according to an embodiment of the present invention.
Figure 3:
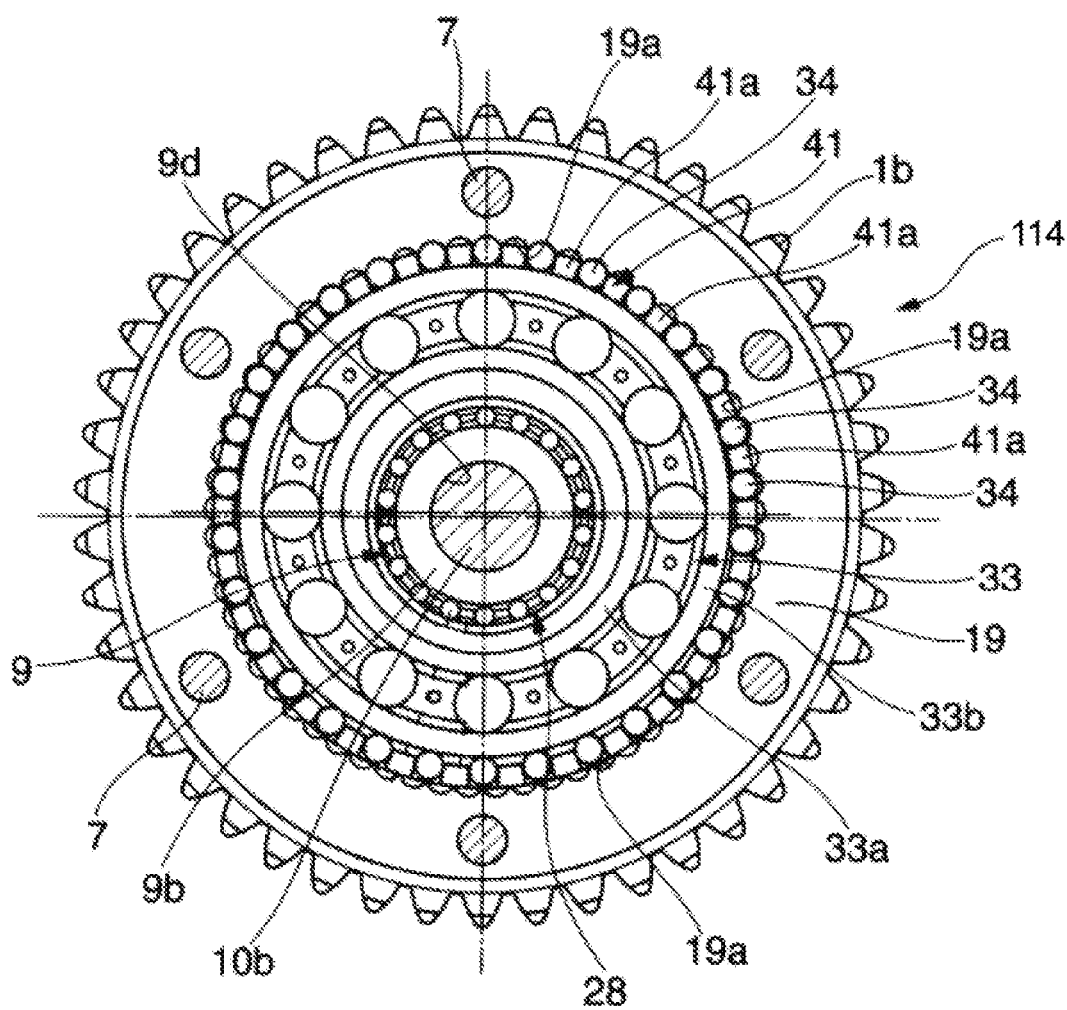
FIG. 3 is a cross-sectional view of the variable valve timing mechanism according to an embodiment of the present invention, taken along A-A line of FIG. 2.
Figure 4:
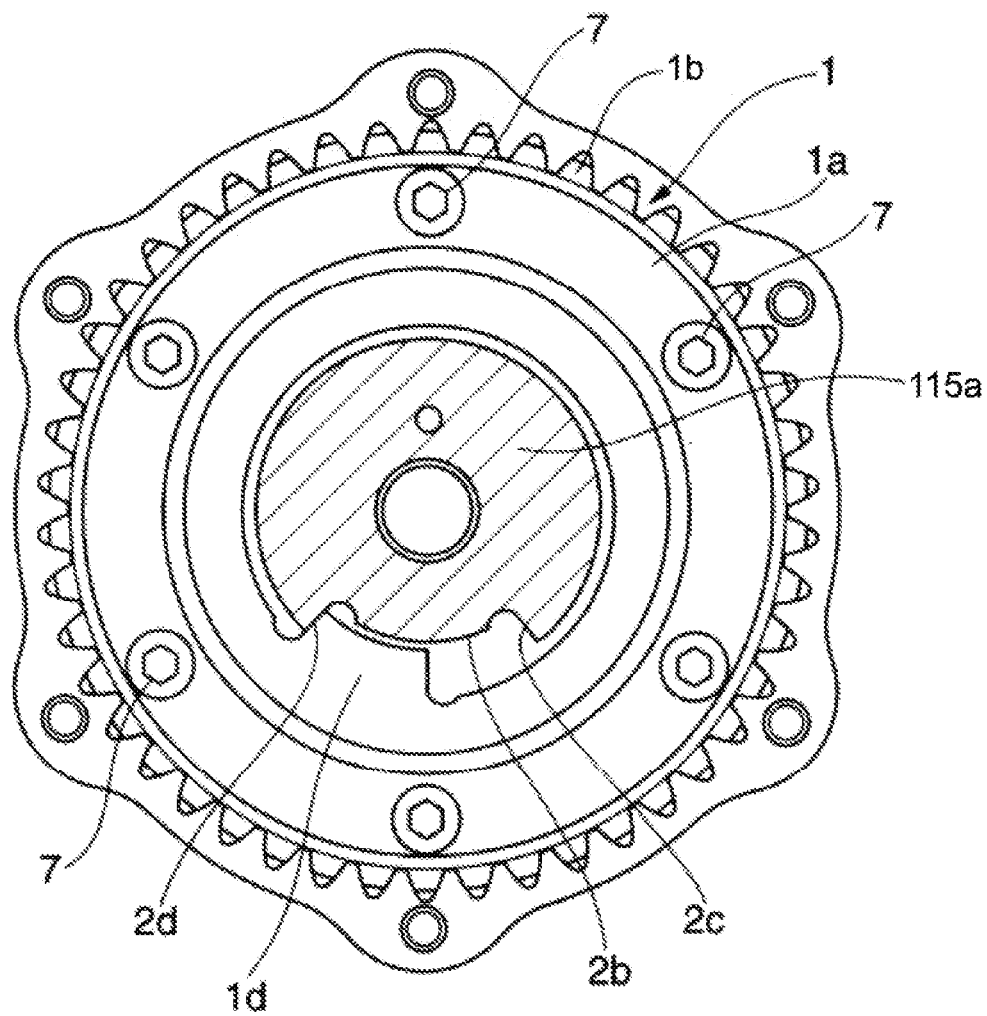
FIG. 4 is a cross-sectional view of the variable valve timing mechanism according to an embodiment of the present invention, taken along B-B line of FIG. 2.

FIGS. 2 to 4 illustrate an example structure of variable valve timing mechanism 114. Note, however, that variable valve timing mechanism 114 is not limited to one having the example structure illustrated in FIGS. 2 to 4, but may be any appropriate known variable valve timing mechanism having a structure that allows variably controlling the rotational phase of the camshaft relative to the crankshaft by adjusting the rotation speed of the motor.

Variable valve timing mechanism 114 illustrated in FIGS. 2 to 4 includes a timing sprocket 1, intake camshaft 115a, a cover member 3, and a phase changer 4. Timing sprocket 1 is an active rotator rotationally driven by crankshaft 109 of internal combustion engine 101. Intake camshaft 115a, which is rotatably supported on a cylinder head with a bearing 44 interposed, is rotated by a torque transmitted from timing sprocket 1. Cover member 3 is disposed in front of timing sprocket 1 and fixed with bolts onto a chain cover 40. Phase changer 4, which is disposed between timing sprocket 1 and intake camshaft 115a, is configured to change the rotational phase of intake camshaft 115a relative to timing sprocket 1.

Timing sprocket 1 includes a sprocket body 1a and a gear portion 1b integrally provided on the outer periphery of sprocket body 1a. Gear portion 1b receives a torque from crankshaft 109 via a timing chain 42 wound around gear portion 1b. Timing sprocket 1 is rotatably supported on intake camshaft 115a with a third ball bearing 43 interposed between a circular groove 1c formed in the inter periphery of sprocket body 1a and the outer periphery of a flange portion 2a integrally provided at the front end of intake camshaft 115a.

An annular protrusion 1e is integrally formed on the outer periphery of a front end portion of sprocket body 1a. To the front end portion of sprocket body 1a, an annular member 19 and an annular plate 6 are fastened and fixed together in the axial direction with bolts 7. Annular member 19, which is coaxially positioned on the inner periphery of annular protrusion 1e, has internal teeth 19a on the inner periphery. Internal teeth 19a collectively serve as a corrugated meshing portion.

Also, as illustrated in FIG. 4, a stopper protrusion 1d is formed so as to span a predetermined circumferential segment of the inner peripheral surface of sprocket body 1a. Stopper protrusion 1d has a circular arc shape and serves an engaging portion. On the outer periphery of the front surface of plate 6, a cylindrical housing 5 is fixed with bolts 11. Housing 5 covers a reduction drive 8, a motor 12, and other components of phase changer 4. Motor 12 is configured to actuate variable valve timing mechanism 114.

Housing 5 is made of an iron-based metal and functions as a yoke. Housing 5 integrally has an annular plate-like housing holding portion 5a on the front end. Housing 5 is disposed such that its outer periphery including housing holding portion 5a is entirely covered with cover member 3 with a predetermined clearance therebetween. Intake camshaft 115a is provided with a drive cam (not illustrated in the drawings) on the outer periphery and a driven member 9 at the front end. The drive cam configured to open intake valves 105. Driven member 9, which serves as a passive rotator, is coupled to the front end of intake camshaft 115a with a cam bolt 10 inserted in the axial direction.

As illustrated in FIG. 4, flange portion 2a of intake camshaft 115a has a stopper groove 2b extending in the circumferential direction. Stopper groove 2b serves as a locking portion for engaging with stopper protrusion 1d of sprocket body 1a. Stopper groove 2b is formed to have a circular arc shape having a predetermined length in the circumferential direction. While stopper protrusion 1d rotates within the range corresponding to the length of stopper groove 2b, one of the opposite circumferential end edges of stopper protrusion 1d come into contact with the corresponding one of opposite circumferential edges 2c, 2d of stopper groove 2b. Such contact mechanically regulates the rotational position of intake camshaft 115a relative to timing sprocket 1 in the advance and retard directions.

In other words, stopper protrusion 1d and stopper groove 2b constitute a mechanical stopper, and the angular range within which stopper protrusion 1d is allowed to move in stopper groove 2b corresponds to the operation range of variable valve timing mechanism 114, i.e., corresponds to the range of variability of rotational phase of intake camshaft 115a relative to crankshaft 109 (the range of variability of valve timing of each intake valve 105). Variable valve timing mechanism 114 reaches the most advanced valve timing position defined by the mechanical stopper when one of the end edges of stopper protrusion 1d comes into contact with the corresponding one of opposite edges 2c, 2d of stopper groove 2b. On the other hand, variable valve timing mechanism 114 reaches the most retarded valve timing position defined by the mechanical stopper when the other of the end edges of stopper protrusion 1d comes into contact with the corresponding one of opposite edges 2c, 2d.

Cam bolt 10 has a head portion 10a, a shaft 10b, and a flange-like washer portion 10c integrally formed on the end surface, closer to shaft 10b, of head portion 10a. Shaft 10b has an external thread on the outer periphery. The external thread is adapted to be screwed into an internal thread formed in intake camshaft 115a so as to extend in the axial direction from an end of intake camshaft 115a. Driven member 9 is made of an iron-based metal. As illustrated in FIG. 3, driven member 9 includes a disk portion 9a at the rear end and a cylindrical portion 9b at the front end, which are integrally formed together.

Disk portion 9a of driven member 9 is integrally provided with an annular step protrusion 9c substantially at the radial center of the rear end surface of disk portion 9a. Annular step protrusion 9c has substantially the same outer diameter as flange portion 2a of intake camshaft 115a. Annular step protrusion 9c and flange portion 2a are inserted into an inner ring 43a of third ball bearing 43 so that the outer peripheral surfaces of annular step protrusion 9c and flange portion 2a are disposed on the inner periphery of inner ring 43a. An outer ring 43b of third ball bearing 43 is press fitted and fixed onto the inner peripheral surface of circular groove 1c of sprocket body 1a.

Disk portion 9a of driven member 9 is further integrally provided with a holder 41 on the outer periphery. Holder 41, which is adapted to hold a plurality of rollers 34, protrudes in the same direction as cylindrical portion 9b from the outer periphery of disk portion 9a and has a plurality of elongated protrusions 41a formed at substantially even predetermined intervals in the circumferential direction. Cylindrical portion 9b has an insertion hole 9d coaxially passing through cylindrical portion 9b. Insertion hole 9d is adapted to receive shaft 10b of cam bolt 10 therethrough. Also, a first needle bearing 28 is provided on the outer periphery of cylindrical portion 9b.

Cover member 3, made of a synthetic resin, includes a cover body 3a bulged in a cup shape, and a bracket 3b integrally provided on the outer periphery of the rear end of cover body 3a. Cover body 3a is disposed so as to cover substantially the entirety of a front end portion of phase changer 4, that is, substantially the entirety of housing 5 extending axially rearward from a holding portion 5b, with the predetermined clearance therebetween. Bracket 3b, formed substantially annularly, has six bolt insertion holes 3f passing through bracket 3b at six boss portions.

Bracket 3b is fixed to chain cover 40 with a plurality of bolts 47. The inner peripheral surface of a front end portion 3c of cover body 3a is provided with inner and outer double slip rings 48a, 48b. Slip rings 48a, 48b are buried and fixed in the inner peripheral surface with their inner end surfaces exposed. Cover member 3 further includes a connector portion 49 at the upper end thereof. Connector portion 49 has a connector terminal 49a connected to slip rings 48a, 48b via a conductive member. To connector terminal 49a, electric power from a battery power source (not illustrated in the drawings) is supplied via control device 201.

Between the inner peripheral surface of a rear end portion of cover body 3a and the outer peripheral surface of housing 5, a first oil seal 50 is interposed as a sealing member. First oil seal 50, which has a substantially C-shaped transverse cross section, includes a synthetic rubber base member and a core metal buried therein. An annular base portion 50a on the outer periphery of first oil seal 50 is fitted and fixed in a circular groove 3d formed in the inner peripheral surface of the rear end portion of cover body 3a. A sealing surface 50b is formed integrally on the inner periphery of annular base portion 50a of first oil seal 50, and is in contact with the outer peripheral surface of housing 5.

Phase changer 4 includes motor 12 and reduction drive 8. Motor 12 is substantially coaxially disposed in front of intake camshaft 115a. Reduction drive 8 reduces the rotation speed of motor 12 and transmits the resultant rotation to intake camshaft 115a. Motor 12, which is, for example, a brushed DC motor, includes housing 5, a motor shaft 13, a pair of semicircular arc shaped permanent magnets 14, 15, and a stator 16. Housing 5 serves as a yoke configured to integrally rotate with timing sprocket 1. Motor shaft 13 is an output shaft rotatably provided in housing 5. Permanent magnets 14, 15 are fixed on the inner peripheral surface of housing 5. Stator 16 is fixed to the inner bottom surface of housing holding portion 5a.

Motor shaft 13 is formed in a tubular shape and functions as an armature. On the outer periphery of a substantially center portion, in the axial direction, of motor shaft 13, an iron core rotor 17 having a plurality of poles is fixed. An electromagnetic coil 18 is wound around the outer periphery of iron core rotor 17. In addition, a commutator 20 is press fitted and fixed on the outer periphery of a front end portion of motor shaft 13. Commutator 20 is divided into as many segments as the poles of iron core rotor 17, and electromagnetic coil 18 is connected to these segments of commutator 20.

Motor shaft 13 is rotatably supported on the outer peripheral surface of a portion, near head portion 10a, of shaft 10b of cam bolt 10 with a needle bearing 28 and a fourth ball bearing 35 interposed. Needle bearing 28, which serves as primary bearing, is arranged side by side with fourth ball bearing 35 in the axial direction. In addition, motor shaft 13 is integrally provided with a cylindrical eccentric shaft portion 30 at the rear end, which is closer to intake camshaft 115a. Eccentric shaft portion 30 constitutes a part of reduction drive 8.

In addition, a second oil seal 32 is provided between the outer peripheral surface of motor shaft 13 and the inner peripheral surface of plate 6. Second oil seal 32 prevents lubricating oil leak from the interior of reduction drive 8 into motor 12. The inner periphery of second oil seal 32 is in elastic contact with the outer peripheral surface of motor shaft 13 so that second oil seal 32 provides frictional resistance against the rotation of motor shaft 13.

Reduction drive 8 mainly includes eccentric shaft portion 30, a second ball bearing 33, rollers 34, holder 41, and driven member 9. Eccentric shaft portion 30 is configured to eccentrically rotate. Second ball bearing 33, which serves as secondary bearing, is provided on the outer periphery of eccentric shaft portion 30. Rollers 34 are provided on the outer periphery of second ball bearing 33. Holder 41 holds rollers 34 so as to prevent movement in their rolling direction but permit movement in the radial direction. Driven member 9 is integrally formed with holder 41. The axis of the cam surface formed on the outer periphery surface of eccentric shaft portion 30 is slightly radially eccentric from the axis X of motor shaft 13. Components including second ball bearing 33 and rollers 34 are configured to collectively serve as a planetary meshing portion.

Second ball bearing 33 is disposed so as to be substantially entirely overlapped by first needle bearing 28 in the radial direction. An inner ring 33a of second ball bearing 33 is press fitted and fixed onto the outer peripheral surface of eccentric shaft portion 30. Rollers 34 are in constant contact with the outer peripheral surface of outer ring 33b of second ball bearing 33.

An annular clearance C is formed around the outer periphery of an outer ring 33b. Clearance C allows the entire second ball bearing 33 to radially move, i.e., to make eccentricity-related movement along with an eccentric rotation of eccentric shaft portion 30. Rollers 34 are adapted to radially move and sequentially fit in internal teeth 19a of annular member 19 along with an eccentricity-related movement of second ball bearing 33, and to oscillate in the radial direction while being guided in the radial direction by protrusions 41a of holder 41.

Lubricating oil is supplied into reduction drive 8 by lubricating oil supply means. Lubricating oil supply means includes an oil supply passage 44a, an oil supply hole 48, a small-diameter oil supply hole 45, and three large-diameter oil discharge holes (not illustrated in the drawings). Through oil supply passage 44a, which is formed in the interior of bearing 44 of the cylinder head, lubricating oil is supplied from a main oil gallery (not illustrated in the drawings) to reduction drive 8. Oil supply hole 48, which is formed in the interior of intake camshaft 115a so as to extend in the axial direction, communicates with oil supply passage 44a through a groove. Oil supply hole 45 is formed in the interior of driven member 9 so as to pass through driven member 9 in the axial direction. One end of oil supply hole 45 opens to oil supply hole 48. The other end of oil supply hole 45 opens near first needle bearing 28 and second ball bearing 33. The oil discharge holes are formed to pass through driven member 9.

Below, the operation of variable valve timing mechanism 114 will be described. First, when crankshaft 109 of internal combustion engine 101 rotates, timing chain 42 transmits the rotation to timing sprocket 1, and timing sprocket 1 rotates accordingly. The resultant torque is transmitted to motor 12 through housing 5, annular member 19, and plate 6, and motor 12 rotate synchronously with crankshaft 109.

In addition, the torque of annular member 19 is transmitted from rollers 34 to intake camshaft 115a through holder 41 and driven member 9. Accordingly, the cam of intake camshaft 115a opens and closes intake valves 105. To advance or retard the rotational phase of intake camshaft 115a relative to crankshaft 109, that is, the valve timing of each intake valve 105, control device 201 supplies power to motor 12 of variable valve timing mechanism 114 and causes motor 12 to generate torque. This motor torque is transmitted to intake camshaft 115a via reduction drive 8.

Specifically, in each revolution of motor shaft 13, eccentric shaft portion 30 eccentrically rotates such that each of rollers 34 rolls over one of internal teeth 19a of annular member 19 to move onto the adjacent internal tooth 19a while being guided in the radial direction by protrusions 41a of holder 41. As motor shaft 13 rotates, rollers 34 sequentially repeat such movement to roll in the circumferential direction. Such rolling movement of rollers 34 transmits a torque to driven member 9 and rotate driven member 9 at a speed reduced from the rotation speed of motor shaft 13. The speed reduction ratio of the transmitted rotation of driven member 9 to the rotation of motor shaft 13 may be set as desired by adjusting, for example, the number of rollers 34.

As a result, intake camshaft 115a rotates in the forward and reverse directions relative to timing sprocket 1 and the rotational phase of intake camshaft 115a changes. Accordingly, the opening/closing timing of each intake valve 105 is advanced or retarded.

Thus, in variable valve timing mechanism 114, when motor 12 is passively rotated by a rotational driving force from timing sprocket 1 and motor shaft 13 rotates at the same rotation speed as timing sprocket 1, the rotational phase of intake camshaft 115a relative to crankshaft 109 (valve timing) does not change.

On the other hand, when motor 12 generates a forward rotation torque and rotates motor shaft 13 at a rotation speed higher than that of timing sprocket 1, that is, when the rotation amount per predetermined time $\Delta t$ of motor shaft 13 is set to be greater than the rotation amount per predetermined time $\Delta t$ of timing sprocket 1, the rotational phase of intake camshaft 115a relative to crankshaft 109 (valve timing) is retarded.

Furthermore, when motor 12 generates a reverse rotation torque and rotates motor shaft 13 at a rotation speed lower than that of timing sprocket 1, that is, when the rotation amount per predetermined time $\Delta t$ of motor shaft 13 is set smaller than the rotation amount per predetermined time $\Delta t$ of timing sprocket 1, the rotational phase of intake camshaft 115a relative to crankshaft 109 (valve timing) is advanced.

In other words, variable valve timing mechanism 114 advances or retards the valve timing (rotational phase) in accordance with the difference between the rotation amount of motor shaft 13 and the rotation amount of timing sprocket 1, that is, in accordance with the rotation speed of motor shaft 13 relative to timing sprocket 1.

Control device 201 has software-based functions to serve as a control unit, i.e., to variably control the rotational phase of intake camshaft 115a relative to crankshaft 109, that is, the valve timing (opening/closing timing) of each intake valve 105 by adjusting the rotation speed of motor 12 of variable valve timing mechanism 114. Control device 201 calculates a target rotational phase TA based on the operational conditions of internal combustion engine 101 (e.g., the engine load, engine rotation speed, engine temperature, and/or whether or not this is during the engine start-up). Also, control device 201 determines an actual rotational phase RA of intake camshaft 115a relative to crankshaft 109.

The target rotational phase TA is a target value in feedback control of variable valve timing mechanism 114 and may be replaced with a target advancing amount, a target valve timing, a target angular change, or the like. Control device 201 performs feedback control on the rotational phase by calculating and outputting the operation variables of motor 12 so as to bring the actual rotational phase RA toward the target rotational phase TA.

Specifically, when the absolute value of the difference between the target rotational phase TA and the actual rotational phase RA is below a preset value SL, that is, when the actual rotational phase RA substantially converges to the target rotational phase TA, control device 201 stops power supply to motor 12 so as to allow motor shaft 13 to passively rotate at the same rotation speed as timing sprocket 1 and maintain the current actual rotational phase RA.

On the other hand, when the absolute value of the difference between the target rotational phase TA and the actual rotational phase RA is above the preset value SL, that is, when the actual rotational phase RA deviates from the target rotational phase TA, control device 201 controls power supply to motor 12 to increase or reduce the rotation speed of motor shaft 13 depending on whether the actual rotational phase RA is advanced or retarded from the target rotational phase TA, so as to bring the actual rotational phase RA toward the target rotational phase TA.

Control device 201 determines an actual rotational phase RA1 based on the crank angle signal POS output from crank angle sensor 203 and the cam angle signal CAM output from cam angle sensor 204. For example, upon receiving each pulse of the cam angle signal CAM, control device 201 may determine the actual rotational phase RA1 (deg) of intake camshaft 115a relative to crankshaft 109. Specifically, by using the number of the accumulated pulses of the crank angle signal POS, conversion from an elapsed time to a crank angle based on the engine rotation speed (i.e., based on the period TPOS of the crank angle signal POS), and the like, control device 201 measures, as the actual rotational phase RA1, a crank angle (deg) from a reference crank angle position detected based on the crank angle signal POS to the crank angle position corresponding to the last pulse of the cam angle signal CAM. Control device 201 may determine, as the actual rotational phase RA1, an advanced crank angle from the most retarded position.

Figure 5:
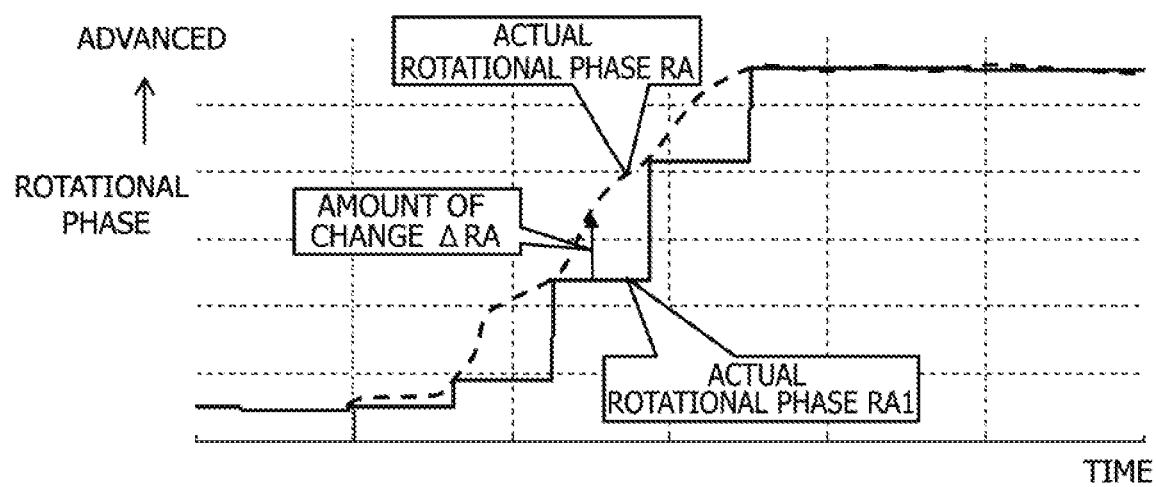
FIG. 5 is a time chart for illustrating interpolation processing between measured values of an actual rotational phase, according to an embodiment of the present invention.

Furthermore, based on the output of motor angle sensor 210, control device 201 calculates an amount of change ΔRA of the actual rotational phase RA over time within the period of the cam angle signal CAM, that is, over a time after the last update of the actual rotational phase RA1 made based on the crank angle signal POS and cam angle signal CAM. Specifically, first, control device 201 calculates the rotation speed of motor 12 based on the motor angle signal MAS output from motor angle sensor 210. Then, based on the difference between the motor rotation speed and the rotation speed of timing sprocket 1 (which is half the rotation speed of crankshaft 109), the speed reduction ratio of phase changer 4, and the like, control device 201 calculates the amount of change dRA per calculation cycle. By adding up the amount of change dRA, control device 201 calculates the amount of change ΔRA of the actual rotational phase RA made after receiving the last pulse of the cam angle signal CAM. After that, control device 201 calculates the final actual rotational phase RA based on the amount of change ΔRA and the actual rotational phase RA1 calculated upon receiving the last pulse of the cam angle signal CAM (see FIG. 5). Control device 201 controls motor 12 based on comparison of the actual rotational phase RA and the target rotational phase TA.

As described above, control device 201 has a software-based function to determine the actual rotational phase RA1 based on the cam angle signal CAM and the crank angle signal POS upon receiving each pulse of the cam angle signal CAM (a software-based function to serve as a first measuring unit), and a software-based function to calculate the amount of change ΔRA of the actual rotational phase RA made over time within the period of the cam angle signal CAM, based on the motor angle signal MAS (function to serve as a second measuring unit). In addition, control device 201 also has a software-based function to diagnose whether motor angle sensor 210 operates normally or abnormally (a software-based function to serve as a diagnosing unit).

Control device 201 calculates the difference between the (latest) actual rotational phase RA1 updated upon receiving the last pulse of the cam angle signal CAM and the actual rotational phase RA calculated using the previous actual rotational phase RA1 and the amount of change ΔRA. When the absolute value of the difference is above a threshold TH (TH>0), control device 201 decides that motor angle sensor 210 operates abnormally. When deciding that motor angle sensor 210 operates abnormally, control device 201 stops the normal control of motor 12, which is based on the actual rotational phase RA calculated using the amount of change ΔRA, and performs processing adapted to an abnormal state (fail-safe processing). In the fail-safe processing, control device 201 controls motor 12 based on the actual rotational phase RA1, which is updated upon receiving each pulse of the cam angle signal CAM, or controls variable valve timing mechanism 114 at its default position (most retarded valve timing position), for example.

Figure 6:
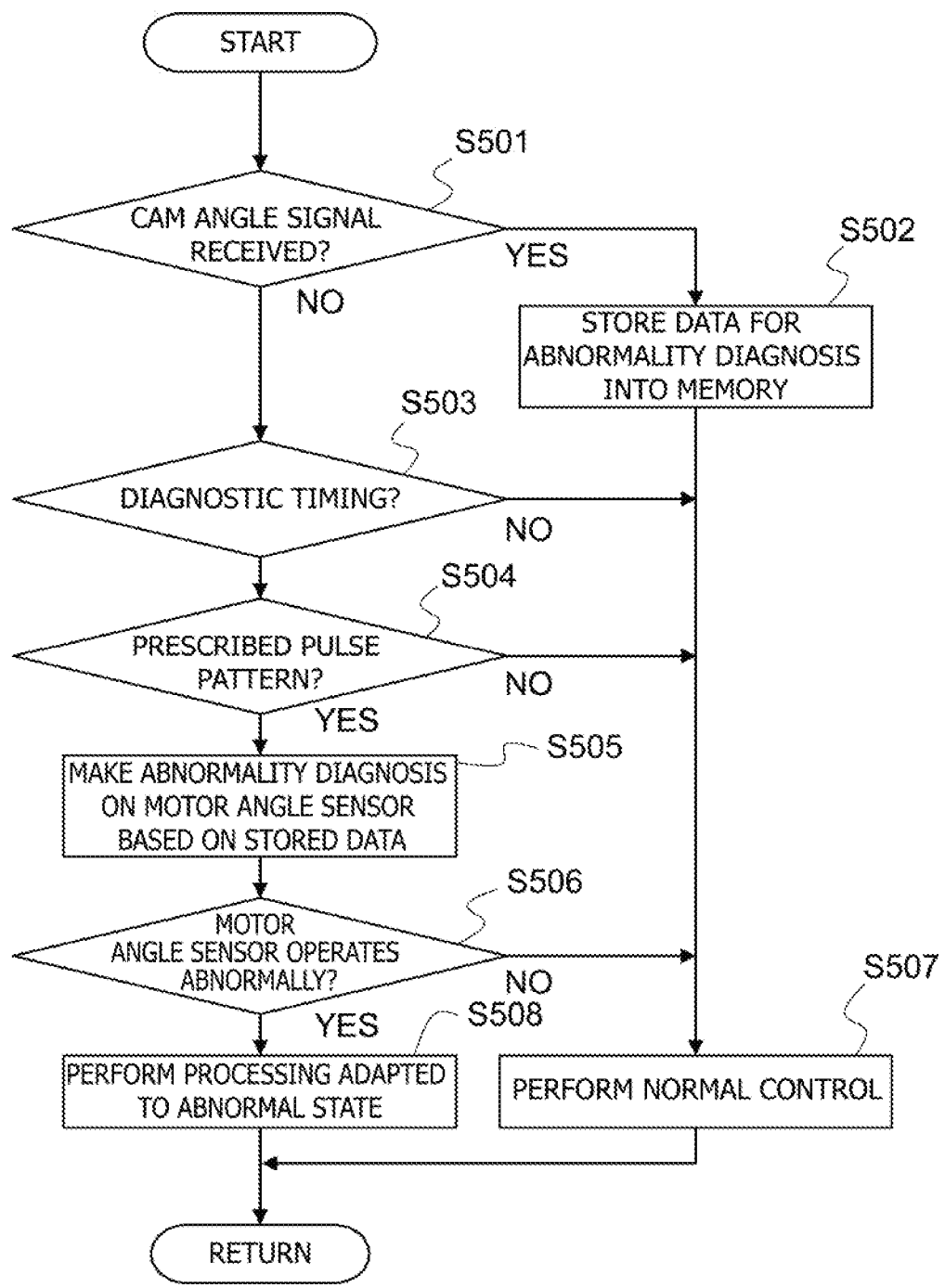
FIG. 6 is a flowchart illustrating diagnostic processing for a motor angle sensor according to an embodiment of the present invention.

The flowchart in FIG. 6 illustrates example diagnostic processing for motor angle sensor 210 performed by control device 201. In step S501, control device 201 first decides whether or not the cam angle signal CAM is received. Specifically, in step S501, control device 201 decides whether or not the leading pulse element of the cam angle signal CAM of the single or double pulse of the cam angle signal CAM output for each crank angle degree that corresponds to the stroke phase difference between cylinders. Thus, control device 201 detects whether or not a pulse of the cam angle signal CAM is received for each crank angle degree that corresponds to the stroke phase difference between cylinders.

When control device 201 detects a pulse of the cam angle signal CAM, the operation proceeds to step S502. In step S502, control device 201 stores data for use in abnormality diagnosis of motor angle sensor 210 into a memory. This data includes the actual rotational phase RA1 calculated based on this pulse of the cam angle signal CAM, the actual rotational phase RA1 calculated upon receiving the previous pulse of the cam angle signal CAM, and the amount of change ΔRA made from the previous pulse of the cam angle signal CAM. On the other hand, when control device 201 decides that control device 201 does not receive a pulse of the cam angle signal CAM at this moment, the operation proceeds to step S503. In step S503, control device 201 decides whether or not this is a diagnostic timing that comes after the last pulse of the cam angle signal CAM.

Figure 7:
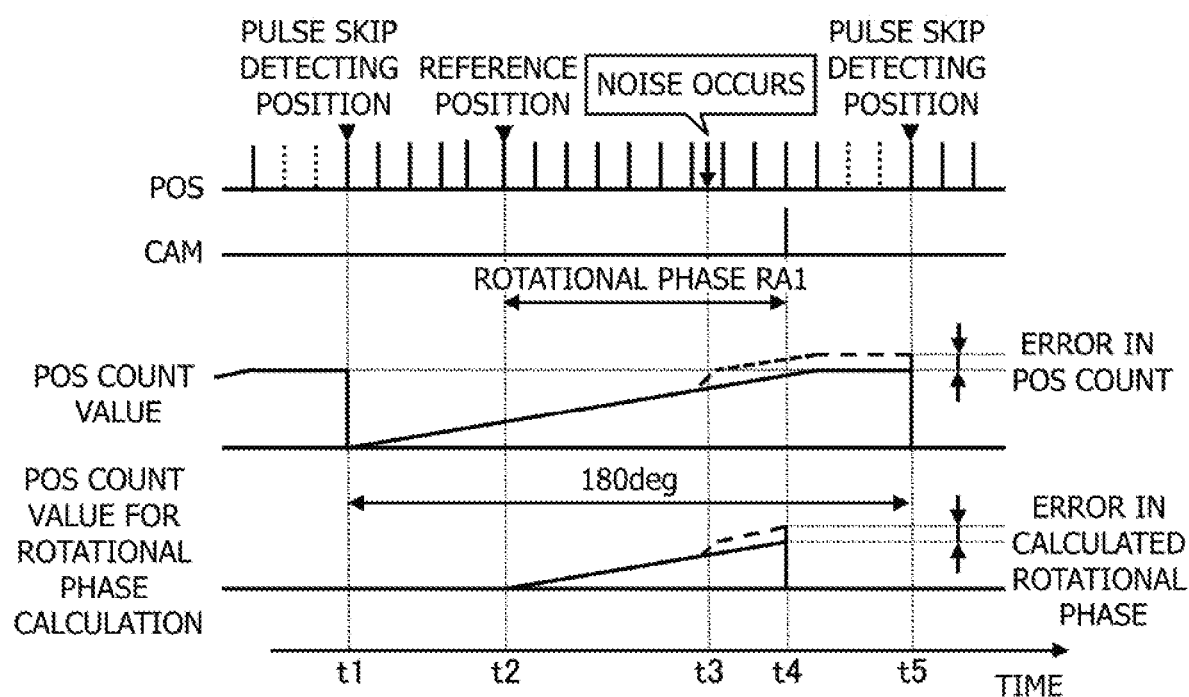
FIG. 7 is a time chart for illustrating that a measured actual rotational phase contains an error when noise is superimposed on a crank angle signal POS, according to an embodiment of the present invention.

The timing chart of FIG. 7 illustrates an example of the diagnostic timing described above. In the example illustrated in FIG. 7, based on the frequency of receiving the crank angle signal POS or the like, control device 201 detects a pulse skip position (non-pulse position) of the crank angle signal POS; in other words, detects the first pulse of the crank angle signal POS after the pulse skip (time point t1). Then, control device 201 detects, as the reference crank angle position, the position corresponding to the (prescribed number)-th pulse of crank angle signal POS from the pulse skip position. Control device 201 measures, as the actual rotational phase RA1, a crank angle from the reference crank angle position to the crank angle position corresponding to the last pulse of the cam angle signal CAM (crank angle of rotation from time point t2 to time point t4).

In addition, in order to measure the actual rotational phase RA1, control device 201 sets a POS count value so as to indicate the number of pulses of crank angle signal POS received after the pulse skip. Control device 201 increments the POS count value upon receiving each pulse of the crank angle signal POS, and resets the POS count value to zero upon detecting the first pulse of the crank angle signal POS after the pulse skip. Control device 201 uses, as the POS count value for calculation of the actual rotational phase RA1, a change in the POS count value made after the detection of the reference crank angle position.

Upon receiving a pulse of the cam angle signal CAM, control device 201 calculates a crank angle from the reference crank angle position to the crank angle position corresponding to this pulse of the cam angle signal CAM, by using the POS count value for calculation of RA1 obtained at the reception of this pulse of the cam angle signal CAM and a crank angle converted from time TIM, and uses the calculated crank angle as the actual rotational phase RA1. Here, the time TIM is time from the pulse of the crank angle signal POS received immediately before this pulse of the cam angle signal CAM to this pulse of the cam angle signal CAM. In the case in which control device 201 calculates the actual rotational phase RA1 by performing the above processing, control device 201 determines that this is the diagnostic timing (at time point t5) in step S503 upon detecting the first pulse of the crank angle signal POS after the pulse skip (at a timing corresponds to the pulse skip position).

Here, as illustrated in FIG. 7, noise may be superimposed on the crank angle signal POS while control device 201 is counting the number of received pulses of the crank angle signal POS. In this case, control device 201 may erroneously determine a noise component as a pulse of the crank angle signal POS, and may unnecessarily increment the count value. This causes an error in the POS count value obtained at the reception of the cam angle signal CAM, and thus causes an error in the actual rotational phase RA1 calculated based on this POS count value.

Also, control device 201 may possibly fail to detect a pulse skip position of the crank angle signal POS. In this case, control device 201 will increment the POS count value instead of resetting the POS count value to zero at the pulse skip position. This causes an error in the POS count value obtained at the reception of the cam angle signal CAM, and thus, causes an error in the actual rotational phase RA1 calculated based on this POS count value. Such detection failure of the pulse skip position is supposed to occur, for example, when noise is superimposed on the pulse skip angular region of the crank angle signal POS, and when the engine rotation speed suddenly increases in the pulse skip angular region of the crank angle signal POS.

Figure 8:
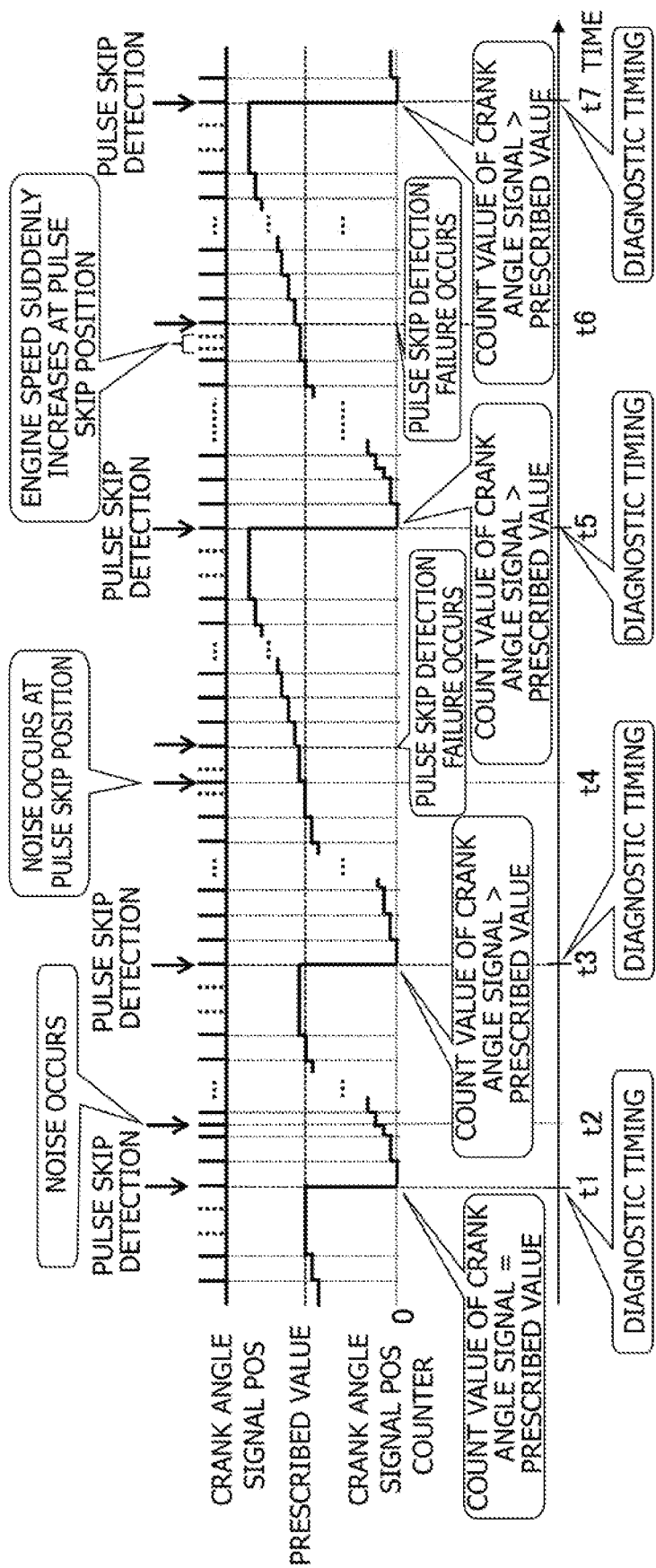
FIG. 8 is a time chart illustrating example changes in a POS count value that occur when noise is superimposed on the crank angle signal POS and when it fails to detect a pulse skip position in the crank angle signal POS, according to an embodiment of the present invention.

FIG. 8 illustrates an example pattern in which noise superimposed on the crank angle signal POS causes an error in the count value of the crank angle signal POS, and example patterns in which control device 201 fails to detect a pulse skip position. In FIG. 8, noise is superimposed on the crank angle signal POS at time point t2, and control device 201 erroneously counts this noise component as a pulse, and causes an error in the POS count value.

Also, at time point t4 in FIG. 8, noise is superimposed on the pulse skip angular region of the crank angle signal POS. This noise component undermines the periodic change of the crank angle signal POS, and control device 201 fails to detect the pulse skip position. Thus, control device 201 does not reset the POS count value to zero at the pulse skip position, and causes an error in the POS count value.

In addition, in FIG. 8, the engine rotation speed suddenly increases in a pulse skip angular region of the crank angle signal POS. This undermines the periodic change of the crank angle signal POS, and control device 201 fails to detect the pulse skip position at time point t6. Thus, control device 201 does not reset the POS count value to zero at the pulse skip position, and causes an error in the POS count value.

When the POS count value is erroneously incremented at time point t2 due to superimposed noise, the POS count value does not match a prescribed value when the diagnostic timing comes at time point t3 when the pulse skip position is detected.

Also, when control device 201 fails to detect the pulse skip position at time point t4 due to noise superimposed in the pulse skip angular region, control device 201 erroneously increments the POS count value at a timing when control device 201 should reset the POS count value to zero. Thus, the POS count value does not match the prescribed value when the next pulse skip position is detected at time point t5.

Similarly, when control device 201 fails to detect the pulse skip position at time point t6 due to a sudden engine speed increase in the pulse skip angular region, control device 201 erroneously increments the POS count value at a timing when control device 201 should reset the POS count value to zero. Thus, the POS count value does not match the prescribed value when the next pulse skip position is detected at time point t7.

Therefore, based on the fact that the POS count value does not match the prescribed value (=15, in the example of FIG. 7) when a pulse skip position is detected, control device 201 can decide that the POS count value has been unnecessarily, excessively incremented due to superimposed noise or that control device 201 has failed to detect a pulse skip position. Thus, in step S503, control device 201 decides that this is the diagnostic timing upon detecting a pulse skip position of the crank angle signal POS.

When control device 201 decides that this is the diagnostic timing (detects a pulse skip position) in step S503, the operation proceeds to step S504. In step S504, control device 201 decides whether or not the POS count value before being reset to zero matches the prescribed value, thereby deciding whether or not the crank angle signal POS has a prescribed pulse pattern. When the POS count value at the diagnostic timing (pulse skip position) does not match the prescribed value, control device 201 decides that control device 201 may have been failed to detect the previous pulse skip position or noise may have been superimposed on the crank angle signal POS. Accordingly, this routine ends before the diagnostic processing for motor angle sensor 210 is performed.

When the POS count value at the diagnostic timing (pulse skip position) does not match the prescribed value, the actual rotational phase RA1 determined based on the POS count value upon receiving the last pulse of the cam angle signal CAM (that is, the actual rotational phase RA1 stored in the memory in step S502) may possibly contain an error. Thus, if control device 201 bases the abnormality diagnosis on comparison of this erroneous actual rotational phase RA1 and the amount of change ΔRA, control device 201 will erroneously diagnose that motor angle sensor 210 operates abnormally.

To avoid this, when the POS count value does not match the prescribed value at the diagnostic timing; in other words, when the crank angle signal POS received by control device 201 does not have the prescribed pulse pattern, control device 201 presumes that the actual rotational phase RA1 includes an error, and cancels the diagnostic processing for motor angle sensor 210 based on the actual rotational phase RA1.

If control device 201 performs abnormality diagnosis of motor angle sensor 210 based on the actual rotational phase RA1 upon receiving each pulse of the cam angle signal CAM, the resultant diagnosis may be based on the actual rotational phase RA1 (POS count value) that contains an error due to detection failure of the pulse skip position or the like.

To avoid this, control device 201 decides whether or not the POS count value matches the prescribed value upon detecting a pulse skip position after receiving the last pulse of the cam angle signal CAM (at time point t5 in FIG. 7). In this way, control device 201 decides whether or not the actual rotational phase RA1 (POS count value) calculated upon receiving the last pulse of the cam angle signal CAM (at time point t4 in FIG. 7) contains an error. When deciding that the actual rotational phase RA1 contains an error, control device 201 cancels the diagnostic processing for motor angle sensor 210.

On the other hand, when the POS count value matches the prescribed value at the diagnostic timing; in other words, when the crank angle signal POS received by control device 201 has the prescribed pulse pattern, control device 201 presumes that control device 201 has properly detected the previous pulse skip position and no noise has been superimposed on the crank angle signal POS, and the operation proceeds to step S505. In step S505, based on the actual rotational phase RA1 calculated upon receipt of the last pulse of the cam angle signal CAM and the amount of change ΔRA, which are stored in the memory in step S502, control device 201 diagnoses whether motor angle sensor 210 operates normally or abnormally.

In other words, when the POS count value matches the prescribed value at the diagnostic timing, control device 201 reliably presumes that the actual rotational phase RA1 calculated using the POS count value at the last pulse of the cam angle signal CAM does not contain an error due to noise or detection failure of the pulse skip position. Thus, control device 201 performs the abnormality diagnosis of motor angle sensor 210 based on this actual rotational phase RA1.

Specifically, in step S505, control device 201 decides whether or not the absolute value of the difference ERA between the amount of change of the actual rotational phase RA1 over the period of the cam angle signal CAM and the amount of change ΔRA accumulated over time within the period of the cam angle signal CAM is below the threshold TH (TH>0). When the absolute value of the difference ERA is above the threshold TH, control device 201 decides that motor angle sensor 210 operates abnormally. When the absolute value of the difference ERA is below the threshold TH, control device 201 decides that motor angle sensor 210 operates normally.

In step S506, control device 201 decides whether it has decided that motor angle sensor 210 operates normally or abnormally. When control device 201 decides that motor angle sensor 210 operates normally, the operation proceeds to step S507. In step S507, control device 201 calculates the actual rotational phase RA by interpolating the actual rotational phase RA1, updated upon receiving each pulse of the cam angle signal CAM, with the amount of change ΔRA, and performs the normal control of motor 12 based on comparison of the actual rotational phase RA and the target rotational phase TA.

On the other hand, when control device 201 decides that motor angle sensor 210 operates abnormally, the operation proceeds from step S506 to step S508. In step S508, control device 201 cancels the interpolation using the amount of change ΔRA, and performs the processing adapted to an abnormal state. In the processing adapted to an abnormal state, control device 201 uses, as the actual rotational phase RA, the unmodified actual rotational phase RA1, which is updated upon receiving each pulse of the cam angle signal CAM, and controls motor 12 based on comparison of this actual rotational phase RA (actual rotational phase RA1) and the target rotational phase TA, or controls variable valve timing mechanism 114 at its default position (most retarded valve timing position), for example.

As described above, when control device 201 fails to detect a pulse skip position of the crank angle signal POS while, for example, internal combustion engine 101 is in a low rotation speed range, or when noise is superimposed on the crank angle signal POS, control device 201 detects that such an event that would cause an error in the actual rotational phase RA1 has occurred, and cancels the diagnostic processing for motor angle sensor 210. This prevents or reduces the risk of erroneously diagnosing that motor angle sensor 210 operates abnormally because of such detection failure of a pulse skip position or superimposed noise.

Here, it may be conceivable to set the threshold TH higher in order not to erroneously diagnose that motor angle sensor 210 operates abnormally because of an error in the actual rotational phase RA1 attributable to detection failure of a pulse skip position or superimposed noise. However, setting the threshold TH higher deteriorates the abnormality detection performance and may cause detection failure of an abnormality that does actually occur in motor angle sensor 210.

In contrast, control device 201 prevents or reduces erroneous abnormality diagnosis by deciding whether or not there is an error factor such as detection failure of a pulse skip position or superimposed noise. Thus, control device 201 is capable of accurately detecting an abnormality in motor angle sensor 210 while preventing or reducing erroneous diagnosis due to an error factor such as detection failure of a pulse skip position or superimposed noise, without the need for setting the threshold TH higher to prevent or reduce erroneous abnormality diagnosis.

Note that the diagnostic timing is not limited to being upon detection of a pulse skip position of the crank angle signal POS. Furthermore, the prescribed pulse pattern used for verification at the diagnostic timing is not limited to the number of the accumulated pulses of the crank angle signal POS. In other words, control device 201 has only to provide the following functions: deciding, at a diagnostic timing that comes after the last pulse of the cam angle signal CAM, whether or not the actual rotational phase RA1 to be used for abnormality diagnosis of motor angle sensor 210 is obtained under the conditions in which the crank angle signal POS and/or the cam angle signal CAM has its prescribed pulse pattern; and deciding, depending on the above decision, whether to perform the abnormality diagnosis of motor angle sensor 210 based on the actual rotational phase RA1 and the amount of change ΔRA. As long as control device 201 provides these functions, control device 201 may verify the presence of any prescribed pulse pattern at any diagnostic timing.

FIG. 9 illustrates another example diagnostic timing and another example prescribed pulse pattern used for validation at the diagnostic timing. In the example illustrated in FIG. 9, the diagnostic timing is set to the cylinder identification timing (at the boundary of the counting window of the cam angle signal CAM) which is based on the cam angle signal CAM. At this diagnostic timing, control device 201 decides whether or not the cam angle signal CAM to be used in calculation of the actual rotational phase RA1 is determined to have the prescribed pulse pattern, and decides, depending on the above decision, whether to perform the abnormality diagnosis of motor angle sensor 210 based on the actual rotational phase RA1 and the amount of change ΔRA.

Control device 201 sets up a counting window based on the crank angle signal POS for counting the number of received pulses of the cam angle signal CAM. Also, control device 201 counts the number of pulses of the cam angle signal CAM received in the counting window, and performs cylinder identification processing based on the number of pulses of the cam angle signal CAM received in the counting window.

Here, the cam angle signal CAM is output every 180 degrees of crank angle (upon each 90-degree rotation of intake camshaft 115a) such that a sequence of "a single pulse, a double pulse (two pulses generated in rapid succession), a double pulse, a single pulse" is repeated (see (A) of FIG. 9). The counting window is configured such that, even after variable valve timing mechanism 114 changes the actual rotational phase RA, the changed pulse positions of the cam angle signal CAM remain within the counting window.

As described above, control device 201 measures, as the actual rotational phase RA1 (deg), the crank angle (deg) from the reference crank angle position to the crank angle position corresponding to the last pulse of the cam angle signal CAM. Here, the cam angle signal CAM indicating the timing for measuring the actual rotational phase RA1 may be erroneously detected in a case such as when pulse missing (instantaneous interruption) occurs in the cam angle signal CAM received by control device 201 (see (C) of FIG. 9), when noise is superimposed on the cam angle signal CAM received by control device 201 (see (B) of FIG. 9), or when internal combustion engine 101 rotates in the reverse direction and a duplicate pulse count of the cam angle signal CAM occurs (see (B) of FIG. 9). In such a case, the actual rotational phase RA1 contains an error, and control device 201 erroneously diagnoses that motor angle sensor 210 operates abnormally.

To avoid this, the diagnostic timing is set to a timing (at the boundary of the counting window) at which control device 201 makes cylinder identification based on the counting result in the counting window after receiving a pulse of the cam angle signal CAM that corresponds to timing for calculating the actual rotational phase RA1.

When control device 201 decides that this is the diagnostic timing (cylinder identification timing) in step S503 of the flowchart of FIG. 6, the operation proceeds to step S504. In step S504, based on whether or not the number of received pulses of the cam angle signal CAM matches a prescribed value, control device 201 decides whether or not the cam angle signal CAM has a prescribed pulse pattern.

In the example of FIG. 9, the count value in the counting window of the cam angle signal CAM repeats the pattern "1, 2, 2, 1". Thus, when the count value is "3" or more (see (B) of FIG. 9), control device 201 may decide that the cam angle signal CAM has a pulse pattern different from the prescribed pattern because of superimposed noise or reverse rotation of internal combustion engine 101. When the count value is "0" (see (C) of FIG. 9), control device 201 may decide that the cam angle signal CAM has a pulse pattern different from the prescribed pattern because of pulse missing (instantaneous interruption).

Furthermore, based on the counting history, control device 201 is also able to decide whether or not the cam angle signal CAM has the prescribed pulse pattern even when the count value of the cam angle signal CAM is "1" or "2". For example, when the latest count value is "1" following the previous count values "1, 1" (see (C) of FIG. 9), or when the latest count value is "1" following the previous count values "1, 2", control device 201 may decide that one pulse is missing in the cam angle signal CAM based on the fact that a double pulse of the cam angle signal CAM should be received (based on the prescribed value=2) at this moment.

When the cam angle signal CAM has a pulse pattern different from the prescribed pattern, control device 201 cancels the diagnostic processing for motor angle sensor 210 using the actual rotational phase RA1 calculated based on the cam angle signal CAM (skips steps S505 and S506). In this way, control device 201 is capable of preventing or reducing the risk of erroneously diagnosing that motor angle sensor 210 operates abnormally based on the erroneous actual rotational phase RA1.

Figure 10A:
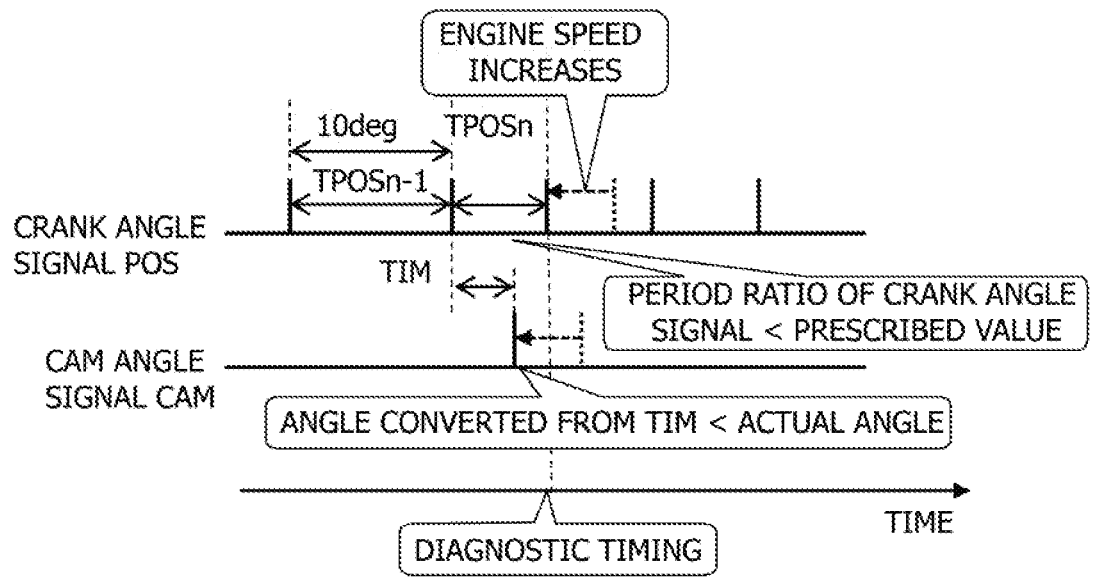
FIG. 10A is a time chart illustrating an error factor introduced in time-to-crank-angle conversion based on time from a pulse of the crank angle signal POS to the next pulse of the cam angle signal CAM.
Figure 10B:
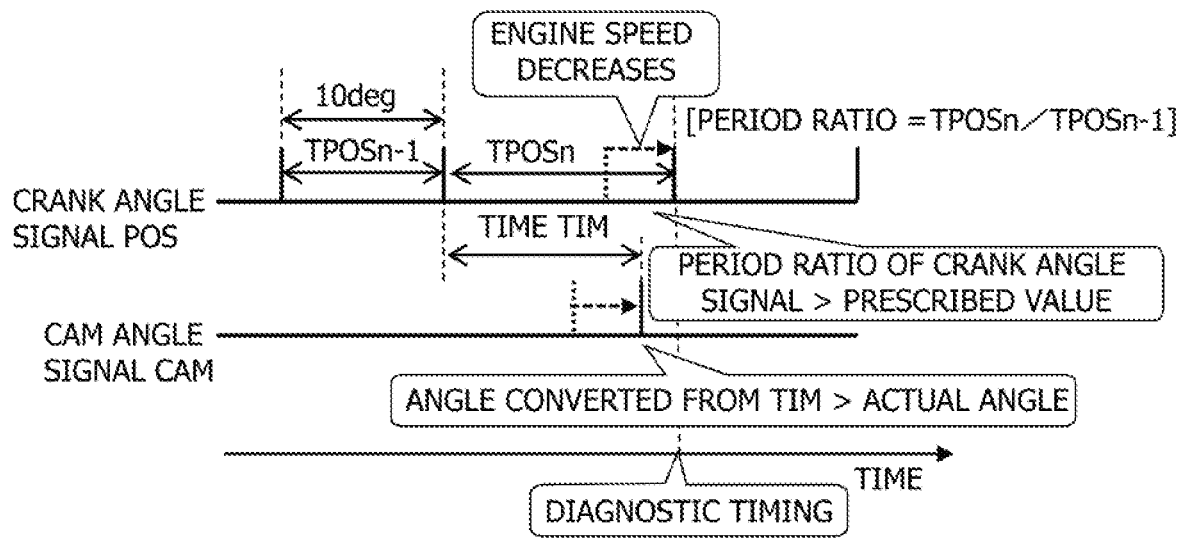
FIG. 10B is a time chart illustrating another error factor introduced in time-to-crank-angle conversion based on time from a pulse of the crank angle signal POS to the next pulse of the cam angle signal CAM.

Another error factor may be introduced when control device 201 calculates the actual rotational phase RA1 using: the number of generated pulses of the crank angle signal POS counted from the reference crank angle position to the crank angle position corresponding to the last pulse of the cam angle signal CAM; and a converted crank angle corresponding to time TIM from the pulse of the crank angle signal POS generated immediately before this pulse of the cam angle signal CAM to this pulse of the cam angle signal CAM (see FIGS. 10A and 10B). In this case, when the rotation speed of internal combustion engine 101 (duration of the period of the crank angle signal POS) suddenly changes while control device 201 receives the cam angle signal CAM, a less accurate crank angle will be obtained by conversion from the time TIM, and will cause an error in the actual rotational phase RA1.

In the case in which the period TPOS of the crank angle signal POS is measured as data corresponding to the rotation speed of internal combustion engine 101, a crank angle is converted from the time TIM from the pulse of the crank angle signal POS generated immediately before the last pulse of the cam angle signal CAM to this pulse of the cam angle signal CAM based on a period TPOSn−1 calculated immediately before the last pulse of the cam angle signal CAM, as illustrated in FIGS. 10A and 10B. Here, the period TPOSn−1 is time from the pulse next previous to the pulse of the crank angle signal POS immediately before the last pulse of the cam angle signal CAM to the pulse of the crank angle signal POS generated immediately before the last pulse of the cam angle signal CAM.

When the engine rotation speed suddenly changes while control device 201 receives the cam angle signal CAM, control device 201 converts the time TIM into a crank angle based on the period TPOSn−1 (engine rotation speed) measured before the sudden change. Thus, a less accurate crank angle will be obtained by this conversion from the time TIM, and will cause an error in the actual rotational phase RA1. FIG. 10A illustrates an example change in the period TPOS of the crank angle signal POS when the engine rotation speed suddenly increases while control device 201 receives the cam angle signal CAM. FIG. 10B illustrates an example change in the period TPOS of the crank angle signal POS when the engine rotation speed suddenly decreases while control device 201 receives the cam angle signal CAM.

To avoid this, in step S503 of the flowchart of FIG. 6, control device 201 decides that this is the diagnostic timing upon receiving a pulse of the crank angle signal POS after the last pulse of the cam angle signal CAM, that is, when measurement of the period TPOSn, which is next to the period TPOSn−1 used to calculate the actual rotational phase RA1, is available.

When control device 201 decides that this is the diagnostic timing upon receiving a pulse of the crank angle signal POS after the last pulse of the cam angle signal CAM in step S503, the operation proceeds to step S504. In step S504, control device 201 decides whether or not the period ratio RT (RT=TPOSn/TPOSn−1) between the latest value TPOSn and the previous value TPOSn−1 (which is the period TPOS used to calculate the actual rotational phase RA1) of the period TPOS of the crank angle signal POS is within a prescribed range around 1, i.e., whether or not the periodic change of the crank angle signal POS is sufficiently small.

When the period ratio RT is within the prescribed range, control device 201 decides that the crank angle signal POS has the prescribed pulse pattern, and the operation proceeds to step S505. In step S505, control device 201 performs the diagnostic processing for motor angle sensor 210 based on the actual rotational phase RA1 and the amount of change ΔRA.

That is, when the period ratio RT is within the prescribed range, a sufficiently accurate crank angle will be obtained by conversion from the time TIM, and will cause a satisfactory minor error in the actual rotational phase RA1. Thus, in this case, control device 201 performs the diagnostic processing for motor angle sensor 210 based on the actual rotational phase RA1 and the amount of change ΔRA.

On the other hand, when the period ratio RT is out of the prescribed range, which means that the periodic change of the crank angle signal POS is greater than the preset value; in other words, the crank angle signal POS has a pulse pattern different from the prescribed pattern suitable for the diagnostic processing for motor angle sensor 210, control device 201 cancels the diagnostic processing for motor angle sensor 210 based on the actual rotational phase RA1 and the amount of change ΔRA.

That is, when the period ratio RT is out of the prescribed range, a less accurate crank angle will be obtained by conversion from the time TIM, and will cause a significant error in the actual rotational phase RA1. This results in a risk of erroneously diagnosing that motor angle sensor 210 operates abnormally. Thus, in this case, control device 201 does not perform the diagnostic processing for motor angle sensor 210.

The technical concepts described in the above embodiment may be used in combination with each other as necessary, as long as no conflict arises. Furthermore, although the invention has been described in detail with reference to the preferred embodiment, it is apparent that the invention may be modified in various forms by one skilled in the art based on the fundamental technical concept and teachings of the invention.

For example, variable valve timing mechanism 114 is not limited to the device illustrated in FIGS. 2 to 4. Alternatively, variable valve timing mechanism 114 may be a variable valve timing mechanism which includes a sprocket, a cam plate, a link mechanism, a guide plate, a reduction drive, and a motor, as disclosed in JP 2008-069719 A, for example.

Also, variable valve timing mechanism 114 may be a device for variably controlling the rotational phase of exhaust camshaft 115b relative to crankshaft 109. In this case as well, control device 201 is capable of performing diagnostic processing similar to the above to diagnose whether motor angle sensor 210 operates normally or abnormally.

Furthermore, in step S502 of the flowchart of FIG. 6, control device 201 may tentatively decide whether motor angle sensor 210 operates normally or abnormally. In this case, control device 201 may maintain this tentative decision made in step S502 as the final decision, when deciding that the crank angle signal POS and/or the cam angle signal CAM has the prescribed pulse pattern in step S504. On the other hand, when deciding that the crank angle signal POS and/or the cam angle signal CAM has a pulse pattern different from the prescribed pattern in step S504, control device 201 may invalidate the tentative decision made in step S502.

Furthermore, in step S502, instead of storing data of the actual rotational phase RA1 and the amount of change ΔRA into the memory, control device 201 may store, into the memory, various measurement data (e.g., POS count value, measured time, rotation speed difference, etc.) to be used in calculation of the actual rotational phase RA1 and the amount of change ΔRA. In this case, in step S505, control device 201 may calculate the actual rotational phase RA1 and the amount of change ΔRA based on the measurement data stored in the memory, and may diagnose whether motor angle sensor 210 operates normally or abnormally based on the calculated actual rotational phase RA1 and the calculated amount of change ΔRA.

Alternatively or additionally, in step S502 of the flowchart of FIG. 6, control device 201 may store measurement of the time TIM from the pulse of the crank angle signal POS generated immediately before the last pulse of the cam angle signal CAM to this pulse of the cam angle signal CAM. In this case, when the operation proceeds to step S505 at the diagnostic timing, control device 201 may calculate the actual rotational phase RA1 by converting the data of the time TIM stored in the memory into a crank angle based on the latest measurement of the period of the crank angle signal POS, and may diagnose whether motor angle sensor 210 operates normally or abnormally based on this actual rotational phase RA1.

Alternatively or additionally, control device 201 may decide whether motor angle sensor 210 operates normally or abnormally based on the actual rotational phase RA1 and the amount of change ΔRA calculated upon receiving the pulse of the cam angle signal CAM that indicates a predetermined one of the cylinders of internal combustion engine 101 reaches the reference piston position. In this case, control device 201 may switch from this predetermined cylinder to another cylinder when the crank angle signal POS and/or the cam angle signal CAM has a pulse pattern different from the prescribed pattern at the diagnostic timing.

Alternatively or additionally, control device 201 may use, as the prescribed pulse patterns used as the criteria for deciding whether to perform the abnormality diagnosis, two or more of the following: the POS count value accumulated between pulse skip positions of the crank angle signal POS; the pulse count value of the cam angle signal CAM; and the period ratio RT of the crank angle signal POS. In this case, when verifying the presence of all the two or more prescribed pulse patterns, control device 201 may diagnose whether motor angle sensor 210 operates normally or abnormally based on the actual rotational phase RA1 and the amount of change ΔRA measured upon receiving the last pulse of the cam angle signal CAM.

Alternatively or additionally, control device 201 may definitively decide that motor angle sensor 210 operates abnormally only after control device 201 made such decisions beyond the preset number of times in a row. In this case, control device 201 does not shift to the processing adapted to an abnormal state until control device 201 definitively decides that motor angle sensor 210 operates abnormally.

REFERENCE SYMBOL LIST

101 Internal combustion engine
105 Intake valve
109 Crankshaft
114 Variable valve timing mechanism
115a Intake camshaft
201 Control device
203 Crank angle sensor
204 Cam angle sensor
210 Motor angle sensor

The invention claimed is:

1. A control device for a variable valve timing mechanism of an internal combustion engine that includes: the variable valve timing mechanism configured to change a rotational phase of a camshaft relative to a crankshaft in the internal combustion engine by adjusting a rotation speed of a motor; a crank angle sensor configured to output a crank angle signal having pulses each generated for a predetermined crank angle degree; a cam angle sensor configured to output a cam angle signal having pulses each generated for a predetermined cam angle degree; and a motor angle sensor configured to output a motor angle signal in accordance with a rotation angle of the motor, the control device comprising:
a first measuring unit configured to measure the rotational phase based on the cam angle signal and the crank angle signal upon each pulse of the cam angle signal;
a second measuring unit configured to measure an amount of change of the rotational phase over time within a period of the cam angle signal, based on the motor angle signal;
a control unit configured to adjust the rotation speed of the motor based on the measurements obtained by the first and second measuring units; and
a diagnosing unit configured to
determine whether or not at least one of the cam angle signal and the crank angle signal has a prescribed pulse pattern at a diagnostic timing that comes after a last pulse of the cam angle signal, and
when at least one of the cam angle signal and the crank angle signal has the prescribed pulse pattern, determine whether the motor angle sensor operates normally or abnormally based on the measurements that the first and second measuring units obtain when the last pulse of the cam angle signal is received before the diagnostic timing,
wherein the control unit is configured to control the motor in a normal state or an abnormal state based on the determination of whether the motor angle sensor operates normally or abnormally.

2. The control device according to claim 1,
wherein the crank angle sensor is configured to output the crank angle signal having pulses each generated for a unit crank angle degree with a pulse skipped for the predetermined crank angle degree,
wherein the first measuring unit detects a pulse skip position of the crank angle signal, and sets a reference crank angle position based on the pulse skip position, and measures, as the rotational phase, a crank angle from the reference crank angle position to a crank angle position corresponding to the last pulse of the cam angle signal, and
wherein the diagnosing unit determines the diagnostic timing is reached when the pulse skip position is detected after the last pulse of the cam angle signal, and
wherein, when a number of pulses of the crank angle signal between consecutive pulse skip positions matches a prescribed value at the diagnostic timing, the diagnosing unit determines whether the motor angle sensor operates normally or abnormally based on the measurements that the first and second measuring units obtain when the last pulse of the cam angle signal is received before the diagnostic timing.

3. The control device according to claim 1,
wherein the crank angle sensor is configured to output the crank angle signal having pulses adapted such that a number of pulses generated in rapid succession indicates which cylinder reaches a reference piston position,
wherein the first measuring unit measures the rotational phase based on a leading pulse of pulses generated in rapid succession of the cam angle signal,
wherein the diagnostic timing is set to coincide with a first timing for determining a number of pulses of the cam angle signal, the first timing coming after the leading pulse, and
wherein, when the number of pulses of the cam angle signal matches a prescribed value at the diagnostic timing, the diagnosing unit determines whether the motor angle sensor operates normally or abnormally based on the measurements that the first and second measuring units obtain when the leading pulse is received before the diagnostic timing.

4. The control device according to claim 1,
wherein the crank angle sensor is configured to output the crank angle signal having pulses each generated for a unit crank angle degree,
wherein the first measuring unit measures the rotational phase by measuring a time from a last pulse of the crank angle signal and the last pulse of the cam angle signal, and converts the time into a crank angle based on a period of the crank angle signal,
wherein the diagnosing unit determines the diagnostic timing is reached when a pulse of the crank angle signal is received after the last pulse of the cam angle signal, and
wherein, when a periodic change of the crank angle signal falls within a prescribed range at the diagnostic timing, the diagnosing unit determines whether the motor angle sensor operates normally or abnormally based on the measurements that the first and second measuring units obtain when the last pulse of the cam angle signal is received before the diagnostic timing.

5. A control method for a variable valve timing mechanism of an internal combustion engine that includes: the variable valve timing mechanism configured to change a rotational phase of a camshaft relative to a crankshaft in the internal combustion engine by adjusting a rotation speed of a motor; a crank angle sensor configured to output a crank angle signal having pulses each generated for a predetermined crank angle degree; a cam angle sensor configured to output a cam angle signal having pulses each generated for a predetermined cam angle degree; and a motor angle sensor configured to output a motor angle signal in accordance with a rotation angle of the motor, the control method comprising:

measuring the rotational phase based on the cam angle signal and the crank angle signal upon receiving each pulse of the cam angle signal;

measuring an amount of change of the rotational phase over time within a period of the cam angle signal, based on the motor angle signal;

adjusting the rotation speed of the motor based on the measured rotational phase and the measured amount of change of the rotational phase; and determining whether or not at least one of the cam angle signal and the crank angle signal has a prescribed pulse pattern at a diagnostic timing that comes after a last pulse of the cam angle signal, and when at least one of the cam angle signal and the crank angle signal has the prescribed pulse pattern, determining whether the motor angle sensor operates normally or abnormally based on the rotational phase and the amount of change of the rotational phase that are measured when the last pulse of the cam angle signal is received before the diagnostic timing, wherein the control unit is configured to control the motor in a normal state or an abnormal state based on the determination of whether the motor angle sensor operates normally or abnormally.

* * * * *